United States Patent [19]

Hershberger et al.

[11] Patent Number: 5,015,418

[45] Date of Patent: May 14, 1991

[54] ACYL MALATE DIESTERS

[75] Inventors: Donald F. Hershberger; Richard A. Plunkett, both of Elkhart, Ind.

[73] Assignee: Haarmann & Reimer Corp., Springfield, N.J.

[21] Appl. No.: 450,680

[22] Filed: Dec. 14, 1989

[51] Int. Cl.$^5$ .............................................. E11C 3/02
[52] U.S. Cl. .............................. 260/410.9 R; 560/190
[58] Field of Search ................... 260/410.9 R; 560/190

[56] References Cited

U.S. PATENT DOCUMENTS 4,124,558 11/1978 Miller et al. .................. 260/410.9 R
4,830,787 5/1989 Klemann et al. ............. 260/410.9 R Primary Examiner—Nicholas S. Rizzo
Assistant Examiner—Edward C. Ward
Attorney, Agent, or Firm—Jerome L. Jeffers

[57] ABSTRACT

Disclosed is a composition comprising a mixture of acylated diesters of dl-malic acid corresponding to the formula:

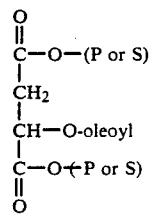

where P is palmityl and S is stearyl.

2 Claims, No Drawings

ACYL MALATE DIESTERS

BACKGROUND OF THE INVENTION

The present invention relates to edible fat mimetic materials which are solid at room temperature and have melting properties similar to those of natural cocoa butter.

It is known that over 70% of cocoa butter triglycerides have the structure:

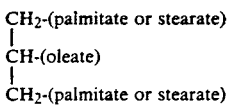

and that most of the remainder are other palmitate, stearate and oleate combinations.

German Offenlegungschrift Patent No. 28 06 804, published Aug. 23, 1979 discloses lipase inhibitory properties for certain fatty acyl hydroxydiacid diesters.

U.S. Pat. No. 4,830,787 discloses fat mimetic materials which are esters of two or more fatty alcohols and at least one fatty acid with hydroxycarboxylic acids. More particularly, this patent discloses fat mimetic compounds of the formula:

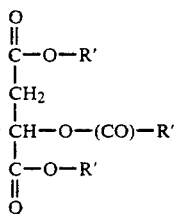

where R' is an aliphatic group containing 4 to 30 carbons and the R' groups, which can be the same or different, are adapted to provide a perceptible fat-like character. In this patent there is expressed a preference for products with melting points below about 98° F. (particularly those with relatively sharp melting points of from about 90° to 98° F.) because such materials provide a mouth feel similar to that of natural fats and oils. The various examples in U.S. Pat. No. 4,830,787 and WO Patent No. 89/01293 which is related thereto, describe the preparation of materials which are oily liquids similar to vegetable oil.

It is an object of the present invention to provide a fat mimetic material having crystallization and melting characteristics similar to those of good quality cocoa butter. Preferably, this material will have a melting range within 30° to 39° C. as determined by the method described later in this specification.

SUMMARY OF THE INVENTION

Disclosed is a composition of matter comprising a mixture of compounds corresponding to the formula:

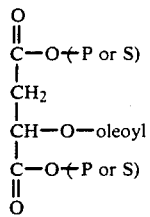

wherein P is palmityl and S is stearyl and the ratio of P to S in the mixture is such that the composition is solid at normal room temperature and has melting characteristics which mimic those of natural cocoa butter.

Also disclosed is a method for the preparation of this composition.

DESCRIPTION OF THE INVENTION

The composition which is the subject matter of the present invention is prepared by a two step procedure:

step (1)

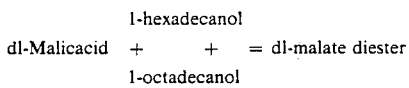

step (2)

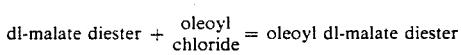

Typically the palmityl-stearyl dl-malate diester mixture is prepared by reacting dl-malic acid with a 50/50 mixture of 1-hexadecanol and 1-octadecanol. The products of this reaction are then converted to the structured fat analogue by oleoylation of the hydroxyl function.

Step 1 is carried out neat or in a suitable solvent, e.g. methanol in which the esterification proceeds partially through temporarily formed methyl esters. The reaction proceeds well at ambient pressure and at the reflux temperature of methanol. Methanol is then displaced and removed from the system by stripping with temperatures up to 80° and pressure down to 5 mm Hg. The dl-malate diester is recovered, such as by crystallization, and dissolved in a solvent suitable for the oleoylation reaction, e.g. pyridine or dichloromethane with triethylamine. Oleoylation preferably is accomplished by acylation with oleoyl chloride although oleoyl anhydride can also be used.

Compositions were prepared using 1-hexadecanol and 1-octadecanol separately to provide palmityl-/oleolyl/palmityl and stearyl/oleolyl/stearyl dl-malic acyl diesters, a one to one mixture of which was found to have a melting range of 41.0° to 42.3° C. Surprisingly, it was discovered that by mixing 1-hexadecanol and 1-octadecanol in reaction (1) to form the malate diester, a composition having the desired melting range resulted. This was especially unexpected in view of the discovery that acyl diesters of tartronic acid, i.e. palmityl/oleolyl/palmityl tartronic, which were expected to have melting properties most like cocoa butter, in fact, had melting points much too high to be of practical value for this application.

The method of practicing the present invention is further illustrated by the following examples:

EXAMPLE I

A. The palmityl/stearyl mixed diesters of dl-malic acid were prepared as follows Mixed 0.06 mole each of 1-hexadecanol (14.55 g) and 1-octadecanol (15.4 g) with 0.05 mole of dl-malic acid (6.7 g), 200 ml methanol, four "Chemfluor" boiling chips and 5 drops of methanesulfonic acid. Refluxed overnight. Stripped of methanol at partial vacuum for 4–5 hours/80° C., stripped at 5 mm Hg vacuum for 8 hours. Dissolved in 400 ml warm hexane and decanted from boiling chips. Obtained a crystal crop by cooling to 15° to 20° C. Filtered and washed with about 50 ml of cold hexane (about 5° C.). A small amount of second crop of crystals was obtained by evaporation of the filtrate. TLC indicated that both products were mostly a single spot with a small amount of slower migrating spot and trace of yet slower spot. After recrystallization of the combined crops from 225 ml hexane at about 15° C. and washing the filtered crystals with cold hexane, 16.79 g of purified material migrating as a single spot by TLC was obtained. GC and mass spec analysis was obtained and results were as follows:

|  | Wt % | Molar % |
|---|---|---|
| diplamityl | 20.66 | 21.60 |
| 1-palmityl, 4-stearyl | 50.60 | 50.73 |
| 1-stearyl, 4-palmityl | | |
| distearyl | 28.74 | 27.68 |

Nearly equal reactivities of the alcohols were indicated. Recovery by crystallization caused partial enrichment of the stearyl content in the recovered diester.

B. The diester prepared in step A was oleoylated as follows

Mixed malate diester (16.0 g) was dissolved in 160 ml of pyridine. Oleoyl chloride, purified by vacuum distillation of practical grade (9.52 g), was added slowly with stirring in one portion. Stirring was continued 64 hours. Water (50 ml) was added and stirred a few hours to quench any unreacted acyl chloride. Hexane (400 ml) was added and the hexane solution was washed with twelve to fifteen portions of warm water (about 400 ml). The hexane solution was dehydrated with anhydrous MgSO$_4$ and filtered. Hexane was evaporated under vacuum and 24.08 g dry material free of pyridine odor was obtained. Hexane (100 ml) was added and the resulting solution (133 ml) was free of crystallization of any kind (product or impurity) after standing several days.

The product was purified by flash chromatography on mix of 50 g 230–400 mesh and 130 g 70–270 mesh silica gel (60Å, Aldrich) using hexane:ethyl acetate mixtures from 100:1 to 100:2 for elution. Two applications were made: (1) 18.0 g of the initial material in 100 ml hexane solution, and (2) 14.5 g comprised of 8.5 g partially purified fractions from the first application combined with 6 g remaining initial material in total 83 ml solution with hexane. A total of 7.08 g of final purified acyl diester was obtained by vacuum stripping of solvent at up to 80° C. This material gave a single spot by TLC on silica gel with 50:3 hexane:ethyl acetate irrigant and iodine/iodide/sulfuric acid detection.

C. The melting properties of the material prepared as described above were determined as follows Melting point specimen slides were prepared by smearing (1) or melting (2) small portions of the acyl diester on 1×1½" glass slides and covering with a thin glass cover slip. Melting properties were observed by PLM (polarized light microscopy) with a microscope fitted with crossed polarizer filters. The slides were aged at room temperature (20° to 25° C.) for several days to ensure transition to higher melting polymorphic forms. The slides were clipped on to a temperature controlled holder (Sensortek model TS-4ER thermal microscope stage) capable of control between −20° and +60° C. at 0.1° resolution. Temperature is sensed at the stage and rapid control is obtained by piezoelectric effect. Transfer of heat to the slide preparation is at a metal/glass surface contact interface which is relatively efficient. The slide preparation temperature will slightly lag the set temperature when heating or cooling the slide above or below ambient temperature. After the sample melts, the temperature is increased another 10° C. for about 20 seconds and then rapidly cooled to obtain a quickly frozen crystal morphology which is observed for melting behavior as was the original, aged preparation.

A reference material (1-tetradecanol, 97%) was used to compare this method of melting point determination to capillary tube observation procedure using a digital melting point apparatus (Electrothermal, Model 8101).

The average melting ranges for these replicate runs were:

| Capillary Method | PLM Method |
|---|---|
| 37.3–39.0° C. | 35.5–39.2° C. |

A bias toward broadening the melting range is obtained with the PLM method. This is the case because observation of small details is much easier with the high magnification (typically 100×) and so onset of any liquid formation is generally observed sooner at a lower temperature. Likewise, last remnants of remaining crystals are easily seen and may require further temperature increase to complete melting.

Cocoa butter is a polymorphic material which can exist in different crystalline forms. When used in confection coatings, it is desirable that the most stable, highest melting crystalline forms predominate. To achieve this goal, the preparation containing cocoa butter is kept at a temperature at which a small amount of the stable desired crystal form can exist. This will be near the high end of its total melting range. After the confection is formed and set by cooling, a gradual temperature increase may be necessary to allow undesired low melting crystalline forms to change into the more stable forms. A desirable mimetic for cocoa butter should have crystalline characteristics similar to cocoa butter for maximum compatibility. It should also have a melting range similar to, but not wider than, that of cocoa butter so that problems with crystallization will not be increased. It is also desirable that its setting temperature not be lower than that of cocoa butter to provide rapid confection formation.

By the PLM method progression of the melting of cocoa butter is indicated initially by liquid formation resulting in a wetted appearance of some of the crystals present. Next, actual flow of liquid carrying with it observable crystals occurs. Finally complete disappearance of bright crystals results in a plain dark field with no bright spots.

The following individual observations were made using slide specimens prepared from the material prepared in Example I and natural cocoa butter.

|  | Melting Range (°C.) | Quickly Refrozen Melting (°C.) |
|---|---|---|
| Melt Specimens |  |  |
| (1) | 38.7 - 39.3 | 29.2 |
| (2) | 38.6 | 29.4 |
| Smear Specimens |  |  |
| (1) | 31.6 (partial flow) - 38.7 | 28 - 29.1 |
| (2) | 32.2 (partial melt) - 36.7 | 27.4 - 28.7 |
| (3) | 31.0 (partial flow) - 37.0 | 28.8 - 29.1 |
| Slide specimens prepared from a fresh sample of good quality cocoa butter (Ambrosia Chocolate Co.) |  |  |
| Melt Specimens |  |  |
| (1) | 30 (start) - 33.5 (flow) - 41.2 (most*) | 27.1 |
| (2) | 31 (start) - 33.4 (flow) - 38.4 (most) | 27.6 |
| Smear Specimens |  |  |
| (1) | 33.1 (start) - 34.9 (flow) - 37.9 (most) | 24.3 - 27.7 |
| (2) | 32.6 (start) - 33.5 (flow) - 38.4 (most) | 23.8 - 29.7 |
| (3) | 32.4 (start) - 33.8 (flow) - 37.4 (most) | 24.5 - 27.7 |

*"Most" indicates that almost all material is melted although some crystals, estimated to be less than 1% of the total material, remain.

Very small amounts of both types of cocoa butter specimen remained unmelted until temperatures as high as 63° C. Similar polymorph melting was observed by quick cooling the completely melted specimen and rapidly determining its melting range.

From the above data, it can be concluded that crystallizing and melting characteristics very similar to those of natural cocoa butter were obtained.

EXAMPLE II

Preparation of 50/50 mixture of dipalmitoyloleoyl dl-malate and distearyl-oleolyl dl-malate

A. Dihexadecyl dl-malate

1-Hexadecanol (87.4 g, 0.36 mole), dl-malic acid (20.1 g, 0.15 mole), methanol (600 ml), methane sulfonic acid (15 drops) and several "Chemfluor" boiling chips were placed in a 1000-ml round-bottomed flask. The mixture was refluxed for 16 hours. Most of the methanol was stripped from the mixture at a pressure of about 250 mm Hg. Stripping was then continued at 5 mm Hg and 80° C. for 6 hours. Final weight was 104.41 g. TLC indicated the composition was about 5:3:2 dihexadecyl ester: methyl hexadecyl ester: hexadecanol. Hexane (500 ml) was added and warmed to dissolve all solids. On slow cooling to about 22° C., a first crystalline crop of 38.91 g was obtained after filtration. By further cooling to about 17° C., a second crystalline crop of 27.21 g was obtained. Residuals of 37.81 g were reserved for recycle. Both crystal crops contained considerable impurity; the second crop, about 50%. Recrystallization from hexane gave material which migrated as a single spot during TLC (80:18:2:2 hexane: ethyl acetate:1-butanol: formic acid irrigant, silica gel plates). This recrystallized product melted at 61.4°-62.7° C.

B. Acylation of dihexadecyl dl-malate with oleoyl chloride

Dihexadecyl dl-malate (91.6 g., 0.157 mole), triethylamine (20.9 g., 0.207 mole), and dichloromethane (500 ml) were placed in a 1000-ml round-bottomed flask and stirred at 20° C. Oleoyl chloride (tech. 75%, 69.4 g, 0.173 mole, assuming no other acyl chloride in the 25% remainder of composition) was added over 5 minutes. A mild exotherm to 35° C. occurred. The mixture was stirred for 64 hours and filtered to remove triethylamine hydrochloride. Dichloromethane was stripped at temperatures up to 75° C. and pressures as low as 5 mm Hg.

Crude product weighing 171.4 g. was obtained vs. a theoretical weight of 155.2 g. Excess weight arises from excess acid chloride and impurities therein.

C. HPLC Purification of palmityl/oleoyl/palmityl dl-malate

Preparatory HPLC was performed on a Waters "Prep LC/System 500A" using four 5.7 cm × 30 cm "Porasil" column cartridges in series. "Porasil" is silica gel of 55–105μ particle size, 120 Å pore size.

The columns were equilibrated with 100:1.5 hexane: ethyl acetate, and this solvent mix used throughout. An injection of 35 g crude product dissolved in 150 ml of solvent mix was about maximum capacity. Injection and elution flow rate was 150 ml/minute. Fractions were monitored by refractive index and TLC. A typical run resulted in 67% pure product, 28.7% recyclable impure product, and 4.1% impurity left on the column. When "on column" impurity started to contaminate product fractions, the columns were flushed with 200 ml of ethyl acetate, which removed column contaminants.

D. Stearyl/oleoyl/stearyl dl-malate was prepared in a similar manner

A 50/50, wt/wt mixture of the POP and SOS dl-malates was prepared by mixing of their melts.

The melting point characteristics of the materials prepared in this experiment are set out in TABLE I.

TABLE I

| Structure | Quick Freeze Crystal MP, °C. | MP (°C.) of Tempered Material |
|---|---|---|
| POP dl-malate | 20.5–22.5 | 39.8–41.7 |
| SOS dl-malate | 37–39 | 37.7–43.8 |
| POP/SOS dl-malate | 34.3 | 41.0–42.3 |

Mixtures were made in other proportions without success in lowering the melting point below that of the POP dl-malate alone.

EXAMPLE III

To obtain about 1 pound of material for more complete evaluation of its physical properties, the following synthesis and purification were performed.

Mixed Palmityl/Stearyl Diester of dl-malic Acid

One mole of palmityl alcohol (1-hexadecanol, 95%, Aldrich, 242.45 g) was combined with one mole stearyl alcohol (1-octadecanol, 95%, Aldrich, 270.5 g) and 0.8 mole dl-malic acid (99%, Aldrich, 107.27 g) and one liter of methanol. Fifty drops methanesulfonic acid and a few "Chemfluor" boiling chips were added and the mixture refluxed overnight. Methanol was removed under partial vacuum, then full aspirator vacuum stripped for 12 hours at about 80° C. The mixture was dissolved in warm hexane and upon cooling obtained crystal crops totaling about 300 g.

The mother liquor was evaporated free of hexane and further reacted with additional alcohol and acid without methanol. A half mole each of the two alcohols and dl-malic acid were added. Methane sulfonic acid (25 drops) was added and when heated under vacuum, the dl-malic acid became solubilized in the mixture within a couple hours. Full aspirator vacuum stripping ($\approx 26\frac{1}{2}$ in Hg gauge) was continued for 12 hours. Crystal crops were obtained from warm hexane solution of the mixture as before. Further recrystallization included sodium carbonate treatment of the solutions in hexane or dichloromethane to remove any residual methane sulfonic acid catalyst. Final material going into two acylation batches contained some impurities estimated by TLC to be 2 to 4% fatty alcohols and about 0.5% of a lesser migrating spot material and 0.5% of substance remaining at the origin. The total crystal weight obtained was 405.45 g in two portions representing 51% of theoretical recoverable. Mother liquors were abandoned. GC assays of the two portions of diester gave the following proportions of dipalmityl:palmityl stearyl plus stearyl palmityl:distearyl weight ratios:

1st portion 1:2.44:1.31

2nd portion 1:3.34:2.27

These compare to 1:2.45:1.39 obtained on the small batch reported previously (Example I). The greater stearyl content of the 2nd portion is believed to be the result of the additional crystallization which was needed for comparable purity of the diester which crystallization resulted in enrichment of the stearyl content. The desired proportion of palmityl and stearyl content will depend on obtainable knowledge from variations made in preparation and resulting properties of the product. Many properties secondary to melting range and crystalline form such as compatibility with other confectionary ingredients and ease of manufacture may require definite proportion ranges.

Oleoylation of Diester

Oleoylation was accomplished in two batches: In the first batch 0.314 mole of diester (192 g) was dissolved in 1110 g dichloromethane and 0.414 mole triethylamine (42 g) was added. Oleoyl chloride (70%, Aldrich) was added slowly over a fifteen to twenty minute period while a cool water bath was applied. A total of 148.2 g (0.345 mole minimum) was used. Temperature did not exceed 31° C. Molar ratio was 1:1.1:1.32 diester:acyl chloride:amine. After mixing four hours, the mixture was filtered to remove triethylamine hydrochloride and stripped of dichloromethane. Hexane (400 ml) was added and the solution slurried with about 200 ml water a few hours.

The second batch was done in like manner using 0.342 mole diester and corresponding amount of other reagents. The hexane solutions were combined and washed several times with warm water. Water remaining emulsified was removed by addition of magnesium sulfate (220 g) resulting in easily separable aqueous layer and crystals.

The final hexane solution (1169.8 g) contained 56% residue on evaporation representing 655 g crude product. Theoretical recovery of $0.656 \text{ mole} \times 875.5$ MW = 574.3 g. The excess is readily accounted for by oleoyl chloride impurity and excess.

Purification of Acyl diester

The crude acyl di-ester solution in hexane was applied to prep HPLC in 30 g (solids) portions on the Waters prep LC/system 500A with 4-500 ml prep pak 500 silica (55-105 μm, 100Å) cartridges in series. Elution was with 1.6% ethyl acetate in hexane. Purges of 250 ml ethyl acetate were applied to the columns after every two runs. Twenty-two injections were made followed by four injections of recyclable fractions. A total of 450 g (17.3 g/run) purified analogue was obtained (78.4% of theory from acylation) and some recyclable fractions were abandoned. A small amount of impurity remained which is indicated by TLC with 50:3 hexane:ethyl acetate as remaining at the origin.

This impurity was reduced somewhat but not eliminated (estimate content at about 0.5%) by batch (10 g) and column (60 g) treatment with Kieselgel 60 G (EM Science). After treatment, 430 g of the acyl diester was obtained for further evaluation.

Melting Data

Smear slide preparations were observed for melting characteristics 40 hours after batching. Two types of crystal were observed. The lower melting form consisted of very fine crystals appearing translucent (crossed polarizers). The higher melting form (assumed to be the highest melting polymorph) appeared to be much brighter. Observed melting of three duplicates were:

| | |
|---|---|
| 35.4 | (flow) - 38.1° C. |
| 33.7 | (lessened - 37.5 (flow) - 38.3° C. translucence) |
| 34.2 | (lessened - 36.7 (flow) - 38.7° C. translucence) |

Quickly frozen complete melts of the above gave other crystalline forms with the following melting ranges:

26.6°-29.0° C.

26.3°-29.4° C.

27.3°-28.9° C.

These melting characteristics are very similar to those reported previously on the 7 g batch first recovered.

What is claimed is:
1. A composition of matter comprising a mixture of compounds corresponding to the formula:
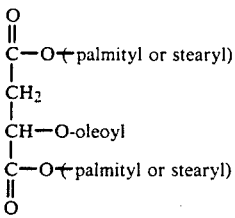
wherein the overall ratio of palmityl to stearyl is such that the composition has a melting range similar to that of cocoa butter.
2. The composition of claim 1 wherein the melting range is from 30° to 39° C. as determined by the polarized light microscopy method.
* * * * *